United States Patent [19]
Rinnert

[11] 3,786,842
[45] Jan. 22, 1974

[54] METHOD FOR EMPTYING AND FILLING BATTERIES AND APPARATUS THEREFOR

[75] Inventor: Helmut Kurt Rinnert, Yorba Linda, Calif.

[73] Assignee: Globe-Union Inc., Milwaukee, Wis.

[22] Filed: Feb. 25, 1972

[21] Appl. No.: 229,275

[52] U.S. Cl.......................... 141/1, 136/175, 141/65, 141/111
[51] Int. Cl............................................... B65b 3/04
[58] Field of Search. 141/110, 98, 111, 59, 65, 106, 141/118, 124, 364, 1–12, 237; 136/162, 175

[56] References Cited
UNITED STATES PATENTS

| 810,034 | 1/1906 | Cerruti | 141/111 |
| 980,756 | 1/1911 | Brescia | 141/111 |
| 1,300,758 | 4/1919 | Neal | 141/111 |

FOREIGN PATENTS OR APPLICATIONS

| 2,178 | 1/1906 | Great Britain | 141/111 |
| 170,265 | 4/1906 | Germany | 141/111 |

Primary Examiner—Houston S. Bell, Jr.
Attorney, Agent, or Firm—John Phillip Ryan et al.

[57] ABSTRACT

A method and apparatus for simultaneously filling and emptying acid from batteries of the lead acid storage type wherein rows of batteries are oppositely disposed with one row directed upwardly and another downwardly and the batteries immersed into the electrolyte acid with the ports of the batteries positioned substantially normal to the acid liquid level. While immersed, the batteries are rotated so that they assume a position somewhat opposite to that initially and the batteries are then raised above the liquid level while tilted approximately 45° from horizontal so that the upwardly disposed batteries will allow acid to flow from them to achieve proper acid filling volumes. The method and apparatus permits a double fill operation wherein rows of oppositely disposed batteries are immersed with the upwardly disposed rows filled with acid, raised from the acid and drained and subsequently immersed and filled to the desired level by the previously indicated tilting procedure.

22 Claims, 8 Drawing Figures

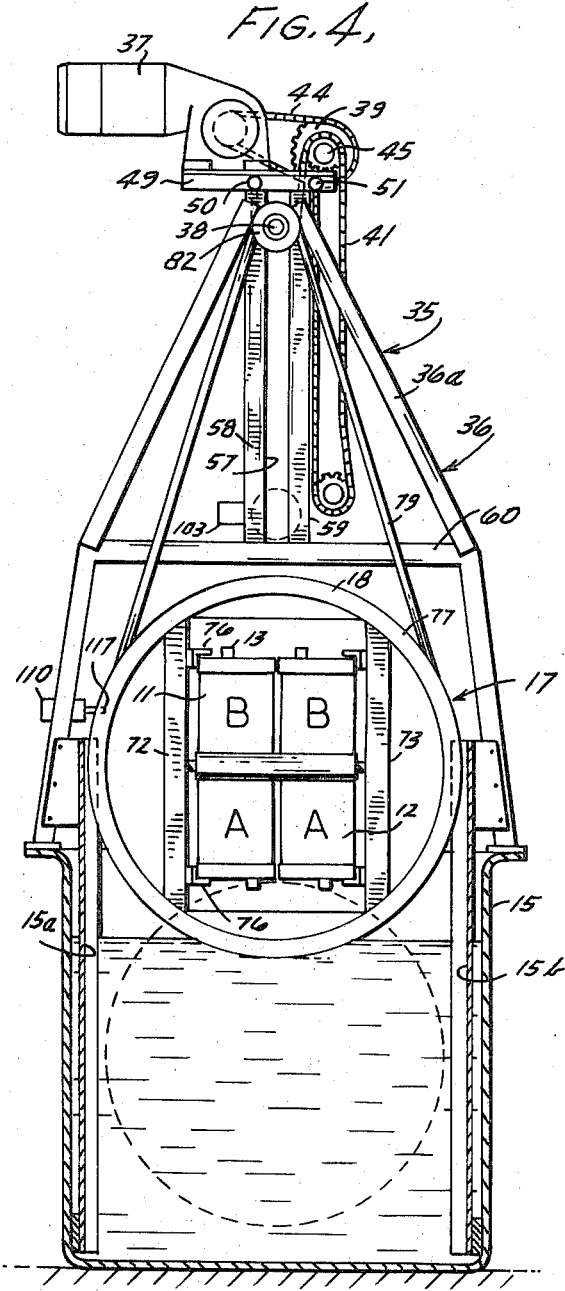
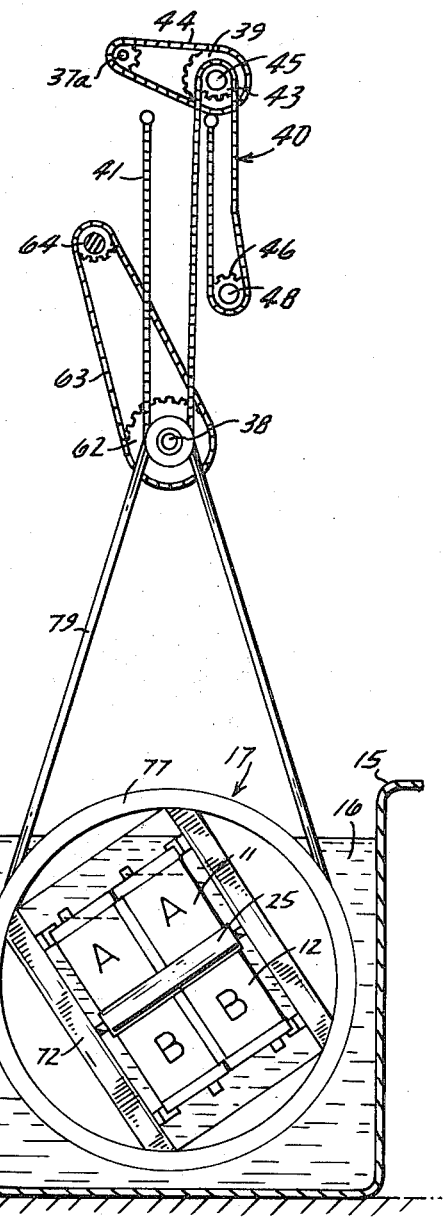

METHOD FOR EMPTYING AND FILLING BATTERIES AND APPARATUS THEREFOR

BACKGROUND OF THE INVENTION

This invention relates to a method and apparatus for filling storage batteries with acid and more particularly, to a method and apparatus which affords the filling and emptying of a plurality of storage batteries wherein numerous battery units can be filled simultaneously to a proper level and all of the units filled, emptied, and filled again to afford filling with acid of a proper specific gravity.

It is standard practice in the battery industry in filling storage batteries with sulfuric acid electrolyte to fill the battery units through their filling ports utilizing a vacuum process. In this process, a header unit is placed over the filling ports and a vacuum is created in the usual compartments of the battery. With the vacuum attained, and held on the battery the acid is drawn into the battery unit and allowed to flow therein until the desired level is reached. This procedure while being somewhat suitable for production line purposes, has several disadvantages. For example, with the advent of the thin-walled battery container such as described in U.S. Pat. No. 3,388,007, the vacuum when placed on the battery container causes the battery endwalls to collapse to a limited degree and to remain in this condition until the vacuum is released. This subsequently causes an expansion of the walls with the lowering of the acid level in the compartments adjacent the endwalls.

Further problems with vacuum filling involve the filling of only one battery unit at a time and the problem of not having all six of the cells filling simultaneously. In many instances, batteries which have been formed using a lower specific gravity forming acid will still have some of the acid remaining when they are filled with the higher specific gravity acid which serves as the electrolyte. Unless precautions are taken to assure that all of the forming acid is removed, it will be retained in the cells so that when the batteries are subsequently filled by the vacuum process a stratification of the higher and lower specific gravities occurs.

There is not presently available a method for filling a plurality of storage batteries with acid which will afford a fast rate and will accomplish this in an accurate manner. Neither is there available an acid filling and dumping machine for lead acid storage batteries wherein the acid electrolyte is first introduced into the cell, subsequently dumped and refilled to the proper level in a quick and efficient manner.

It is an object of the present invention to provide a novel method and apparatus for filling lead acid storage batteries with acid electrolyte. It is another object of this invention to provide a means for filling lead acid storage batteries with acid in a manner which is efficient and highly adaptable to production line rates. It is still another object of the present invention to provide a method for simultaneously filling a plurality of batteries with acid while at the same moment emptying other battery units. It is yet another object of this invention to provide a novel apparatus which will accommodate numerous battery units at one time and subject them to a sequence of immersion, filling, emptying and subsequent immersion and filling to a proper level.

SUMMARY OF THE INVENTION

The foregoing objects are accomplished and the shortcomings of the prior art are overcome by the present method and apparatus which places at least two oppositely disposed rows of lead acid storage batteries in a support means so that the filling ports of the batteries are unobstructed. Means are provided for lowering the rows of batteries into a container having a determined level of sulfuric acid. The rows of batteries are completely immersed in the acid with the filling ports of one row opposite to the other and in a manner substantially normal to the level of the acid. The row of batteries with their ports upwardly disposed will fill with acid and then will be rotated to a position within a 90° angle from the liquid level and upon being removed from the acid will be tilted at approximately a 45° angle to allow excess acid to flow from the battery and back into the container to afford a proper filling level. To assure that the acid of a proper specific gravity is contained in the batteries, a double filling procedure is afforded by the novel process and apparatus of this invention wherein the row of batteries with their ports upwardly disposed are first filled, then rotated to a somewhat bottom position with the batteries previously having their ports positioned in the downwardly position are then allowed to fill. All of the units are then removed from the acid and those which were just filled are allowed to drain. New battery units are then placed over the drained units and the process is repeated.

BRIEF DESCRIPTION OF DRAWINGS

A better understanding of the present method and apparatus for filling storage batteries with acid electrolyte will be accomplished by reference to the drawings wherein:

FIG. 4 is an end view partially in vertical section taken along line 4—4 of FIG. 3.

FIG. 5 is a view showing the drive mechanism for raising and lowering the battery units and illustrating the units immersed in a tank filled with acid.

DESCRIPTION OF THE PREFERRED EMBODIMENT

Figure 2:
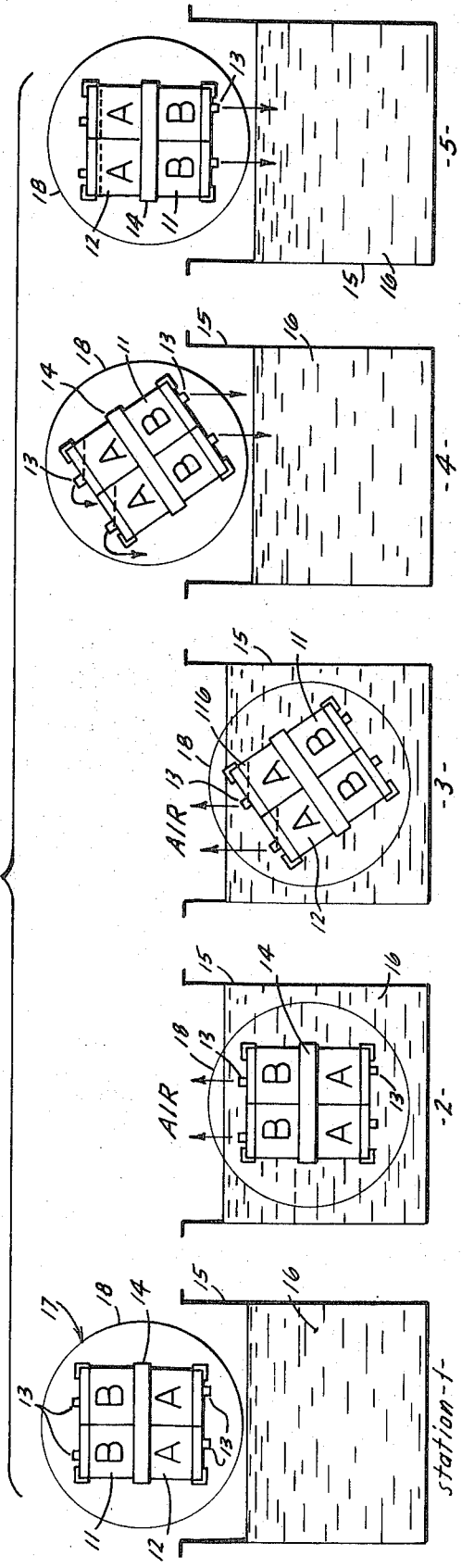
FIGS. 2 and 2A are a schematic view illustrating the various steps in filling the battery units by the method and apparatus of this invention.
Figure 2A:
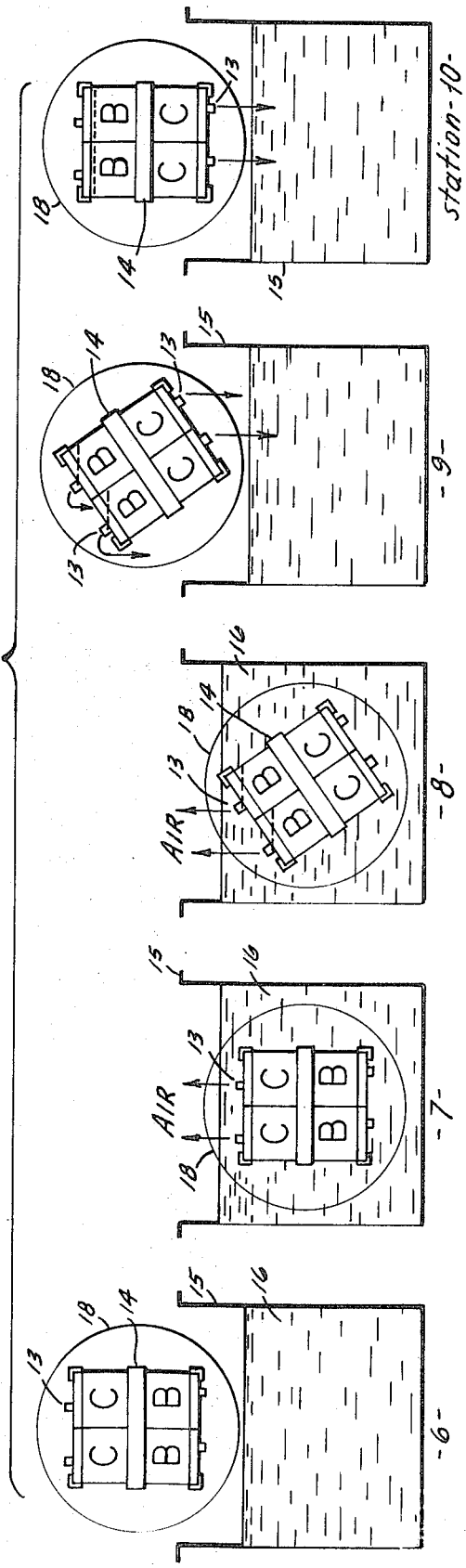

The method of this invention is best understood by reference to FIGS. 2 and 2A in the drawings representing the various steps and their sequence in immersing, filling, rotating, draining, and refilling the various battery units with acid. Battery units are indicated by the numerals 11 and 12 as well as the letters A and B to indicate two separate double rows of batteries with their filling vents 13 positioned in opposite directions. The batteries 11 and 12 are held by a suitable conveyor rack 14 over a container tank 15 containing a suitable level of sulfuric acid 16. In understanding the sequence, it should be understood that the rows of batteries illustrated by the letter A are from a previous cycle and have already once been immersed, filled, and drained. Batteries B as shown in station 1 in FIG. 2 have just been moved into rack 14 which is suitably disposed in rotating drum 17. With the two double rows in position, they are lowered into tank 15 so that the upper row as indicated by batteries B are completely immersed in the acid. Acid will flow into batteries B as the air from the batteries flows upwardly and out of them. Batteries A with their filling vents in an inverted position will not receive any acid because of the resulting airlock. The batteries will remain in the position indicated by station 2 for about 20 seconds. After this period of time, the batteries will be rotated approximately 135° to attain the position illustrated in station 3. In this position, air will flow out of batteries A and acid will flow into a desired level as indicated by the tilted position of the batteries. The batteries will remain in station 3 for approximately 40 seconds. After this period of time, they will be lifted from the container tank 15 and any excess acid from batteries A will flow off from and out the filling vents and back into the container while acid will begin to flow out from batteries B and into the tank. The batteries will remain in the position shown in station 4 for about 20 seconds. They will then be rotated approximately 45° to attain a straight upright position with respect to the acid level as indicated in station 5 where they will remain for approximately 20 seconds while batteries B will drain almost all of the acid and batteries A will be removed from rack 14 and replaced with batteries C as shown in station No. 6. Stations 6–10 are duplications of those indicated in 1–5 and the same sequence as previously indicated will be repeated. This procedure will result in batteries B being subjected to a cycle of filling, dumping, and refilling to the desired electrolyte level.

The time sequence for positions 1–5 is not critical and 120 seconds has been found to work well. This can vary to a minimum time of 10 to 15 seconds for each station resulting in a time cycle range of 100 to 150 seconds. Practicality would determine maximum times. Any number of battery units within practical limits can be processed in accordance with the indicated steps. In actual use when handling group 24-type batteries, two double rows, each row containing eight batteries has been successfully employed for a total of 32 batteries being processed at one time.

It should be better understood that those batteries such as indicated by the letter A will have been previously formed by standard forming procedures wherein forming acid having a lower specific gravity that the sulfuric acid used as an electrolyte will have been emptied at a previous station. However, residual acid will remain in the cells and plates of the battery and unless a substantial effort is made to remove it, enough will remain so that when the battery is filled by the usual filling methods such as vacuum filling, the acids of two different specific gravities will be mixed to result either in a stratification or a specific gravity less than that which is normally utilized for an electrolyte. In the method of this invention as shown in FIG. 2, the steps of double filling the battery units such as those represented by the letters B will effectively remove most of the lower specific gravity forming acid by the initial filling and dumping procedure shown in stations 1–5.

While the filling of the batteries to the desired level is shown by rotation of drum 18 so that the batteries are positioned in a tilted manner at stations 3 and 8 while immersed in the acid, it is not necessary that they be positioned at approximately the 45° angle. They could be retained in an upright position while immersed in the acid and then after being lifted from the acid be tilted to the desired angle which will dictate the desired level. Of course, this is not the most efficient procedure as a substantial quantity of acid will have to flow back from the batteries and into the container.

The apparatus which has been advantageously employed to carry out the previously discussed method is shown in FIGS. 1 and 3–6. An initial dumping station indicated generally by the numeral 20 is employed having an acid dumping tank 33 supporting a rotatable drum rack 19 in a two part framework 34. Four L-shaped rack members three of which are shown at 22 extend between vertical posts 22a in pulleys 27 and 28 and are spaced from conveyor 23 so as to accommodate storage batteries 11 in both an upright and inverted position. Pulleys 27 and 28 are rotatably supported by two chains 25 and 26, respectively, the latter being driven by drive pulleys 29 and 29a. Intermediate drive sprocket 30 as well as drive pulleys 29 and 29a are mounted on drive shaft 31 which is suitably journaled on frame 34 by bearing supports 31a. The usual drive chain 30a provides the necessary driving link with primary drive sprocket 24b and electric motor 24 for rotating drum rack 19.

Acid dumping machine 20 provides a dump station and double filling and emptying apparatus 35 comprises a double filling, flushing and mixing station.

The double filling and emptying apparatus 35 as is true of dumping apparatus 20 is suitably mounted on container tank 15 and includes a support structure 36 with uprights 36a and crossmember 60 to which is secured bar members 58 and 59 for mounting elevator motor 37 on crossbar 49. This is best seen in FIG. 4.

Figure 3:
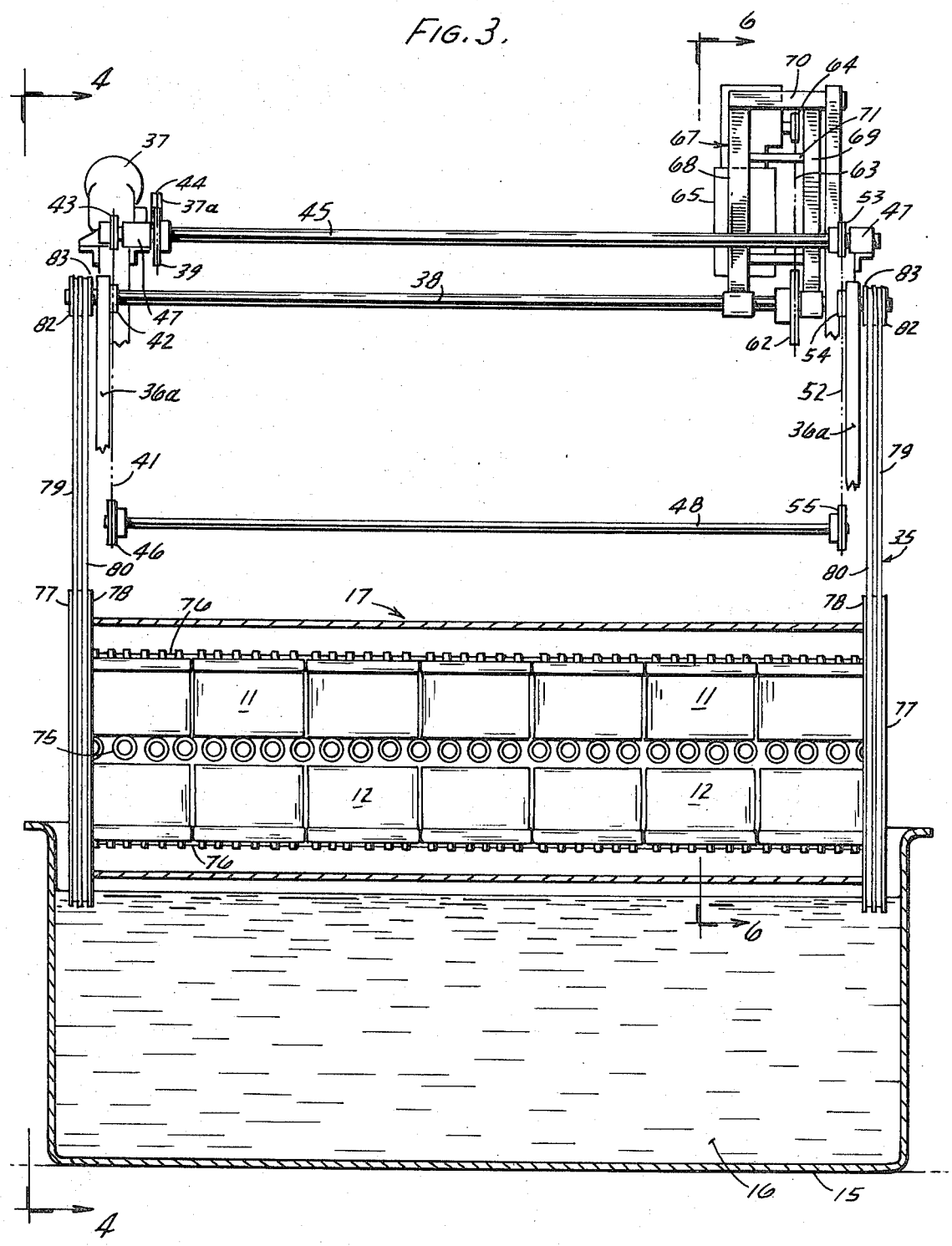
FIG. 3 is a view in side elevation and partially in vertical section illustrating the apparatus for double filling and emptying the battery units with electrolyte acid.

As best shown in FIG. 5, elevator shaft 38 which rotatably supports drum 17 is raised and lowered by a chain and sprocket mechanism generally 40. This is composed of a chain member 41 which engages and supports shaft 38 by a suitable sprocket such as shown at 42 (FIG. 3) and continues over drive and support sprocket 43 and around sprocket 46 secured to shaft 48 which serves as a chain aligning device. The ends of chain 41 are secured to the crossarm 49 of support 36 such as indicated at 50 and 51. Drive sprocket 43 on shaft 45 is driven by intermediate drive sprocket 39 engaged by chain 44 which in turn is driven by primary drive sprocket 37a on electric motor 37. It will be recognized that sprocket members are disposed at each end of shafts 45, 38, and 48 so that a drive mechanism with a second chain such as shown at 52 will engage similar sprockets 53, 54, and 55 on shafts 45, 38, and 48, respectively. This is best shown in FIG. 3. Drive shaft 45 is suitably journaled and supported by means of bearing blocks 47 supported on support structure 36 by upper crossarms 49.

Figure 6:
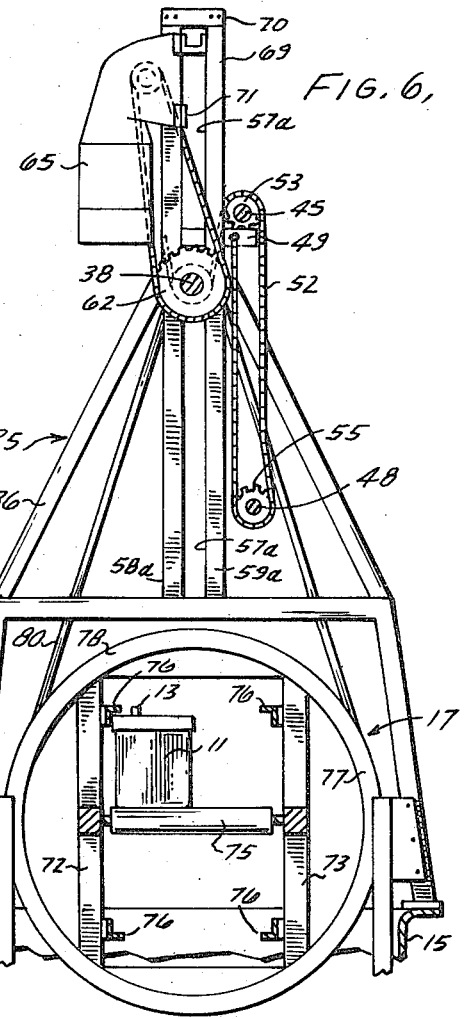
FIG. 6 is a partial view in vertical section taken along line 6—6 of FIG. 3 and showing the drive mechanism for rotating the drum which contains the battery units and showing the drum in its most upward position.

Elevator shaft 38 is guided in an upward and downward movement by means of channel 57 disposed between upwardly extending spaced bar members 58 and 59 with the bar members suitably supported by lower crossmember 60 of supporting structure 36. As shown in FIG. 6, a similar channel 57a formed from bar members 58a and 59a guide elevator shaft at the opposite end.

Elevator shaft 38 is rotated by means of sprocket 62 and chain 63 driven by drive sprocket 64 and a second drive motor 65 which is supported and carried by elevator shaft 38 by means of a motor support mounting generally 67. Two support posts 68 and 69 are secured to shaft 38 and interconnected at the top by crossmember 70 which rides in channel 57a for stabilizing motor mounting 67. Suitable crossbars such as shown at 71 extend between support posts 68 and 69 for attachment with motor 65.

A rotatable drum rack 17 is rotatably supported by means of support frame 36 and comprises four L-shaped rack members 76 which extend lengthwise between and attached to two pairs of posts 72 and 73 inside of both pulleys 77 and 78. Conveyor 75 is supported centrally within pulleys 77 and 78 by posts 72 and 73 and racks 76 are spaced from conveyor 75 to accommodate and retain two double rows of batteries 11 and 12. Two pairs of belts 79 and 80 extend between the pulleys 77 and 78 as well as around similar pulleys 82 and 83 secured on elevator shaft 38. It will be noted that pulleys 83 and adjacent sprockets 42 and 54 on shaft 38 serve to guide shaft 38 along channels 57 and 57a and guide walls 15a and 15b are provided in tank 15 to direct drum rack 17 therein.

Figure 7:
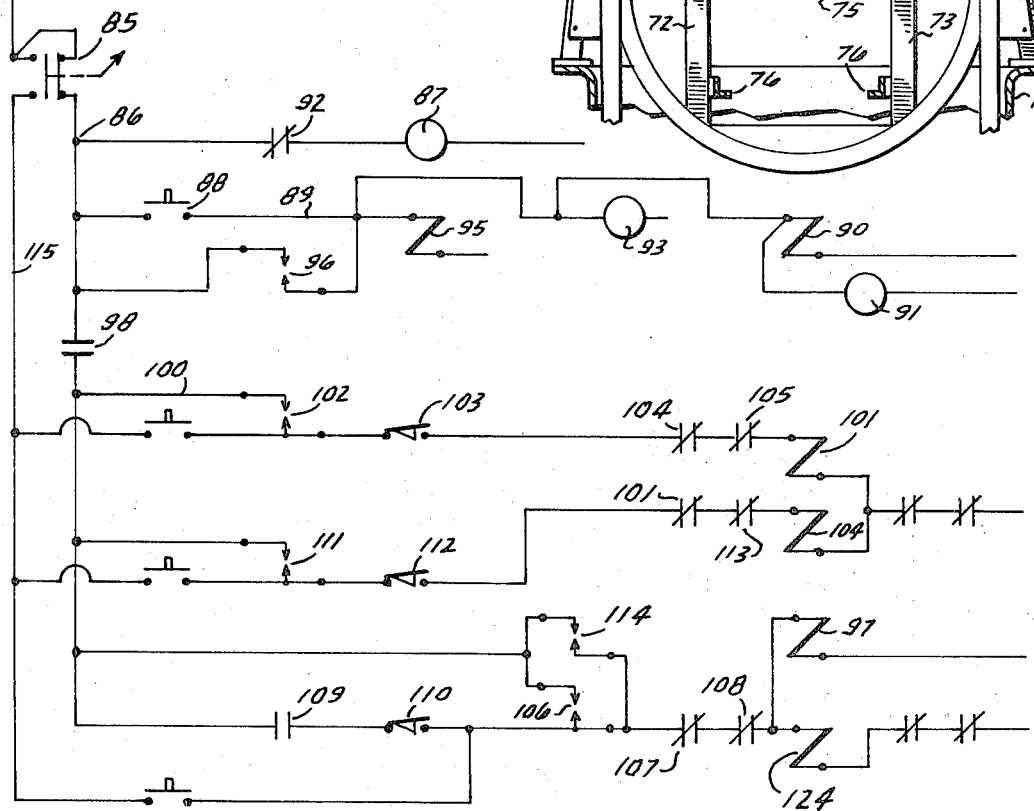
FIG. 7 is a schematic view of the circuitry employed to automate the mechanism specifically shown in FIGS. 3–6.

The circuitry for effecting an automatic operating sequence for the double filling and emptying apparatus 35 is illustrated in FIG. 7. Switch 85 will be placed in an automatic position and will cause the power to flow in line 86. This will cause a cycle "Off" light 87 to burn. An operator will then push cycle switch 88 which will power line 89. This energizes hold-in relay 90 and cycle "On" light 91 will burn and cycle "Off" light 87 will go off by means of relay contacts 92 of relay 90. Cam timer 93 and cam timer solenoid 95 will then be energized. Cam timer 93 will run until cam contacts 96 will close. This will energize the circuit for a single cycle and the operator can release the single cycle start button 88. With relay 90 energized, relay contacts 98 of relay 90 are closed and line 100 is energized. This energizes cam switch 102 and the motor control contacts 101 causing the elevator motor 37 to lower shaft 38 and drum rack 17 by means of moving chain 41 over sprocket 43 in a counterclockwise manner as viewed in FIG. 5. At its lowest point of travel, the drum will trip interlock limit switch 103 positioned near the lower part of bar 58 and stop the elevator motor 65. At approximately 25 percent of the 2 minute cycle time, filler rotator motor contacts 124 of motor 65 and filler rotator relay 105 are energized through cam 106 which interlocks motor 65 forward contacts 107 and reverse contacts 108 and are held in energizing position through relay contacts 109 and limit switch 110. This causes the drum rack 18 to assume the position shown at station 3. At approximately 58 percent of the 2 minute cycle time, cam switch contacts 111 will be closed. Elevator shaft 38 will rise with motor starter 104 through cam 111 contacts, energized of elevator motor 37, limit switch 112, relay 101 and contacts 113. Limit switch 112 located near the upper portion of bar 58 de-energizes motor reverse control 104. This is the position of drum 18 shown at station 4. At the same time, filler rotator motor 65 will be energized through relay 97 by means of cam 114 as well as motor forward and motor reverse contacts 107 and 108 and held in through relay 109 and limit switch 110 until post 117 on drum 17 contacts switch 110. This then will end the cycle and drum 18 will be as shown at station 5. As noted in the circuit drawing and indicated by line 115, a manual operation of the circuitry is also afforded.

OPERATION

Figure 1:
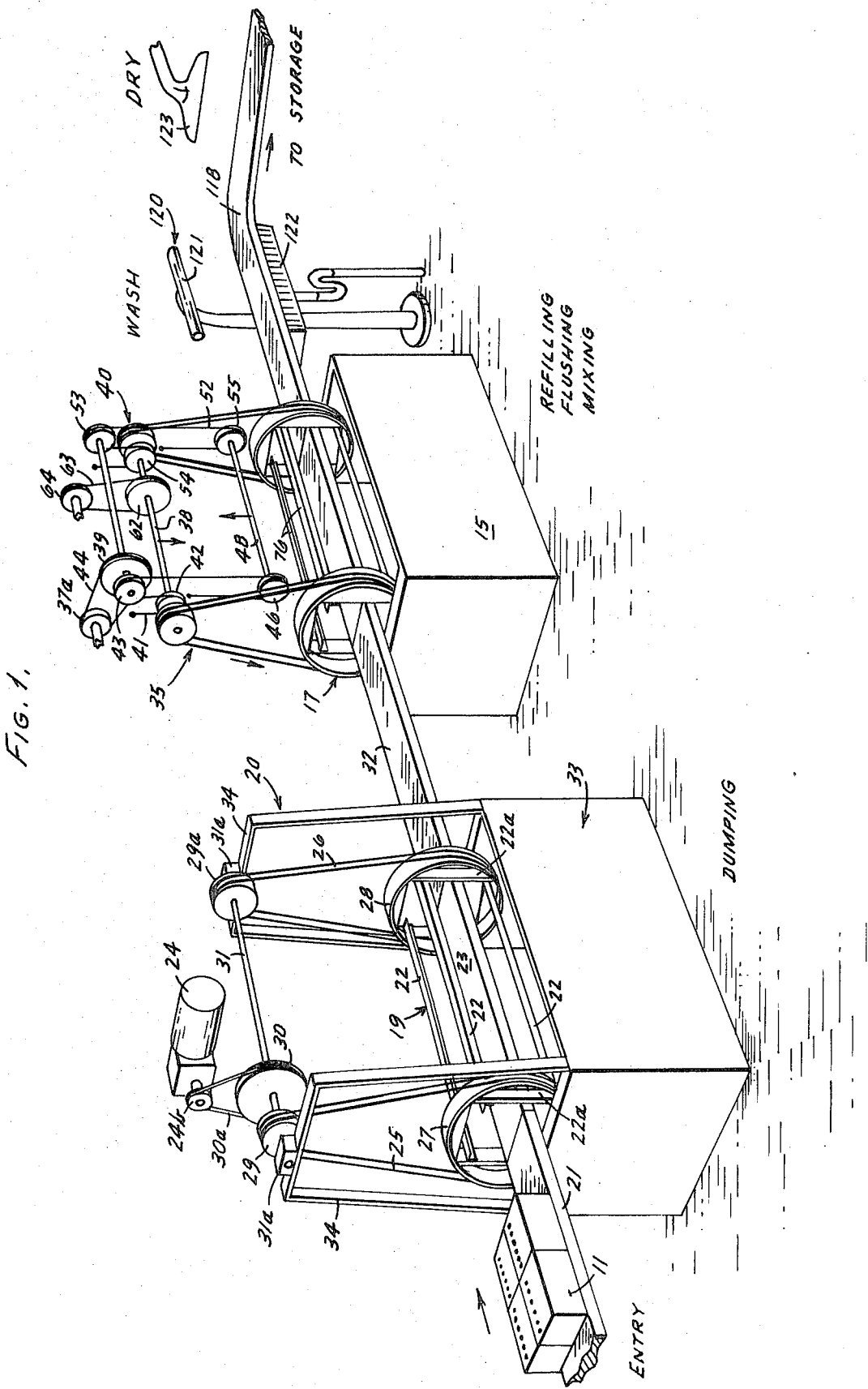
FIG. 1 is a perspective view showing a preliminary dumping station on the left and the double fill and emptying apparatus on the right interconnected by a conveyor.

A better understanding of the advantages of the acid double fill machine 35 and method of this invention will be had by a description of its operation. Referring to FIG. 1, battery units such as 11 will be moved in two rows along a conveyor 21 and into the acid dumping machine generally 20. The batteries will be positioned in rotatable drum rack 19 and secured therein by means of L-shaped racks 22 and conveyor 23. The batteries will, at this stage, have been previously formed in the usual manner and will contain forming acid. When they are positioned in the rotatable drum rack 19, motor 24 will be energized by a suitable switching mechanism and a timing circuit so as to cause the rotatable drum rack 19 to rotate 180° and thereby cause the acid to flow into the bottom tank 33 from the battery units which will be placed in an inverted position. This rotation is effected by means of the two chains 25 and 26 which engage the end pulleys 27 and 28 on the drum rack and are turned by drivewheels 29 and 29a on drive shaft 31. After the acid flows from the battery units, the rack will be rotated 180° back to its original upright position. At this stage the two rows of batteries will be moved across the intermediate conveyor 32 and into the double filling and emptying apparatus 35 where the battery units will be in two rows indicated by the number 11 or B. At this point and with the two rows of battery units in a compact position, an operator will push the cycle switch 88 which will operate the double filling and emptying apparatus 35 in accordance with the description of the circuitry previously given. It is estimated that it will take approximately 10 to 20 seconds to position the two rows of batteries 11 in the drum rack 18. Rotatable drum rack 17 will next be lowered in a vertical manner such as shown at station 2 and those batteries indicated by the letter B will fill with acid through their upright vent filling ports 13 while those indicated by the letter A and which have previously been subjected to same hereinafter described cycle which batteries B are undergoing will not fill with acid because of the airlock which will be formed in them by the surrounding acid attempting to gain entrance through the filling ports 13. The batteries will remain in station 2 for approximately 20 seconds whereafter drum rack will be rotated about 135° to bring batteries A to approximately a 45° angle from the acid level. They will remain in station 3 for approximately 40 seconds and will fill to the level indicated by the numeral 116. After the 40 second interval, the drum rack 18 will be lifted with the batteries disposed at a 45° angle as shown in station 4 and any excess acid in batteries A will flow from the battery units and back into tank 15. Those batteries indicated by the letter B will immediately begin to empty and after a 20 second interval at station 4, the battery units will be brought to their upright position by movement of drum rack 18 as shown in station 5. Batteries B will continue to drain for approximately 20 seconds while batteries A will be removed and new batteries C which have previously been dumped of their forming acid will be positioned as shown at station 6 in FIG. 2. The process will then be repeated for stations 6–10, it being noted that batteries B from station 1 to station 10 will be filled, emptied, and refilled to the desired level.

After being filled to the desired level, batteries A will be moved out of double fill machine 35 and onto conveyor 118, through a wash station 120 composed of a spray head 121 and drain 122 and subsequently beneath a drying station 123. The batteries are then ready for storage.

While not shown in the drawings, a control panel for housing the time camming elements, relays and the starting and stop switches for both dumping machine 20 and filling machine 35 can be conveniently located between the two machines so that one operator can attend to the entire operation.

A battery rack 14 is illustrated for use with two double rows of batteries totalling 32 in opposing positions. If desired, two single opposing rows could be utilized, or if practical, three or four double opposing rows of any practical number could be utilized. Adjustments could also be made to L-shaped rack members 76 to accommodate batteries of different heights.

The method of this invention contemplates the added advantage of utilizing a double fill battery procedure. However, the immersion technique with the batteries tilted at substantially a 45° angle would be useful in and of itself to fill the multiplicity of batteries to the desired level. Further, a preliminary dumping station is indicated for use with advantage with the double fill machine, if desired, this particular step could be eliminated and the batteries dumped by some other means.

It will thus be seen that through the present invention there is provided a method and apparatus for filling and dumping storage batteries with electrolyte acid in a manner which is fast, efficient and will operate to fill a large number of batteries at one time. The preferred apparatus for effecting the method is easily automated so that it can be operated by a single operator and yet no specialized equipment is involved. Accurate filling as well as a double filling procedure is afforded in a minimal amount of time. No distortion of the battery endwalls is effected such as in the standard vacuum filling and a stratification of forming acid and electrolyte acid is eliminated by the double filling procedure.

The foregoing invention can now be practiced by those skilled in the art. Such skilled persons will know that the invention is not necessarily restricted to the particular embodiments herein. The scope of the invention is to be defined by the terms of the following claims as given meaning by the preceding description.

I claim:

1. A method for simultaneously filling and emptying acid from a battery having the usual filling ports comprising: positioning at least two said batteries with their filling ports in opposing directions and with one said battery directed substantially upwardly and another substantially downwardly, immersing said batteries into said acid with the ports of said batteries below the liquid level of said acid, rotating the batteries while immersed in said acid so that said batteries assume a position substantially opposite to that initially and raising said batteries above said liquid level.

2. The method as defined in claim 1 wherein a multiplicity of said batteries are aligned in opposing rows while being immersed, rotated and raised.

3. The method as defined in claim 2 wherein at least two pairs of opposing rows of said batteries are aligned, immersed, rotated, and raised.

4. The method as defined in claim 1 wherein said batteries are rotated approximately 135° while below the level of said acid to result in one of said rows being placed at approximately 45° with respect to the acid level.

5. The method as defined in claim 4 wherein said batteries are subsequently raised while being positioned at said 45° angle.

6. The method as defined in claim 1 wherein said batteries which ultimately attain an upright position are removed and replaced with additional batteries while those in an inverted position are subsequently immersed, rotated and filled.

7. The method as defined in claim 1 wherein certain of said batteries are immersed, filled, emptied, and again immersed, and filled without being emptied.

8. The method as defined in claim 1 wherein said immersing, rotating, raising and tilting takes place over a period of approximately 2 minutes.

9. A method as defined in claim 1 wherein said inverted batteries at the completion of said raizing step are drained of substantially all of said acid.

10. A method as defined in claim 1 wherein said batteries are rotatably supported in an acid bath during said immersing, rotating, and raising.

11. The method as defined in claim 1 wherein said batteries are first filled with forming acid, formed and emptied of said forming acid.

12. A method for filling a plurality of storage batteries having the usual filling ports with acid comprising: positioning at least two said batteries with their filling ports in opposing directions and with one said battery directed substantially upwardly and the other substantially downwardly, immersing said batteries into said acid with the ports of said batteries below the liquid level of said acid, rotating the batteries so that said batteries assume a position substantially opposite to that initially, immersing said batteries in said acid while in said opposite position to permit the upwardly positioned battery to fill with acid and raising said batteries above said liquid level.

13. The method as defined in claim 12 wherein said batteries are disposed at an angle of about 45° when removed from said acid.

14. An apparatus for filling and emptying a plurality of storage batteries having filling ports with acid electrolyte comprising: a container for said acid with a determined level of acid, means to hold a plurality of some of said batteries in an upright position and other said batteries in an inverted position with said filling ports in open communication with said acid, means to lower and raise said holding means into and out of said container and means to rotate said holding means while said holding means is maintained in said container and below said acid level.

15. The apparatus as defined in claim 13 wherein said holding means comprises a double elongated rack with a central conveyor disposed between each rack.

16. The apparatus as defined in claim 13 with said rack and said conveyor constructed and arranged to receive two double rows of batteries.

17. The apparatus as defined in claim 13 wherein said means to raise and lower said holding means comprises a pair of chain and sprocket mechanisms wherein said chain are fixed at both ends and in a looped manner, a main support shaft rotatably supported by said chains and sprocket drives disposed in supporting engagement with said chains to move determined lengths of chains between the fixed ends and means to drive said sprocket drives.

18. Apparatus as defined in claim 16 wherein said main support shaft is guided in its upward and downward movement by a slotted bar extending above said acid container.

19. The apparatus as defined in claim 16 wherein said rotation means includes a pair of pulley members encircling said holding means and an additional pair of pulleys disposed on said main support shaft and a pair of belts disposed on both said pairs of pulleys.

20. The apparatus as defined in claim 16 further including a first motor drive to rotate said sprocket drives and a second motor to drive said main support shaft with said pulleys.

21. The apparatus as defined in claim 13 further including timing means to operate said raising and lowering means and said rotating means in a sequential and predetermined manner.

22. The apparatus as defined in claim 13 further including an additional holding means rotatably disposed over an additional container for emptying and receiving sulfuric acid and means to convey lengths of rows of batteries from said receiving container to said holding means operatively associated with said raising and lowering means.

* * * * *